(12) United States Patent
Bauduin et al.

(10) Patent No.: US 10,415,671 B2
(45) Date of Patent: Sep. 17, 2019

(54) GEARBOX COMPRISING AN IMPROVED REDUCTION GEAR

(71) Applicant: SAFRAN TRANSMISSION SYSTEMS, Colombes (FR)

(72) Inventors: Lionel Bauduin, Houilles (FR); Maxence Guillemont, Colombes (FR); Julien Viel, Argenteuil (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 50 days.

(21) Appl. No.: 15/560,195

(22) PCT Filed: Mar. 22, 2016

(86) PCT No.: PCT/FR2016/050632
§ 371 (c)(1),
(2) Date: Sep. 21, 2017

(87) PCT Pub. No.: WO2016/151238
PCT Pub. Date: Sep. 29, 2016

(65) Prior Publication Data
US 2018/0094698 A1 Apr. 5, 2018

(30) Foreign Application Priority Data

Mar. 24, 2015 (FR) ..................... 15 52426

(51) Int. Cl.
*F16H 1/22* (2006.01)
*F02C 7/32* (2006.01)
*F16H 37/06* (2006.01)

(52) U.S. Cl.
CPC ............... *F16H 1/222* (2013.01); *F02C 7/32* (2013.01); *F16H 37/065* (2013.01);
(Continued)

(58) Field of Classification Search
CPC .................................. F16H 1/222; F02C 7/32
See application file for complete search history.

(56) References Cited

U.S. PATENT DOCUMENTS 1,513,945 A * 11/1924 Vincent .................. F16H 1/222
74/665 GB
3,416,309 A * 12/1968 Elmes .................... B64D 41/00
60/39.15
(Continued)

FOREIGN PATENT DOCUMENTS

FR  2 041 815 A1  2/1971
FR  3 006 733 A1  12/2014

OTHER PUBLICATIONS

International Search Report dated Jun. 17, 2016 in PCT/FR2016/050632 filed Mar. 22, 2016.
(Continued)

*Primary Examiner* — Terence Boes
(74) *Attorney, Agent, or Firm* — Oblon, McClelland, Maier & Neustadt, L.L.P.

(57) ABSTRACT

A gearbox for an aircraft turbine engine includes a drive shaft, a secondary drive shaft coupled to the drive shaft with a reduction mechanism, and output shafts, each of which is coupled to the drive shaft or to the secondary drive shaft with a set of ring and pinion gears, wherein the reduction mechanism includes an intermediate shaft, a first end coupled to the drive shaft with a first stage of gears and the second end coupled to the secondary drive shaft with a second stage of gears, and wherein the intermediate shaft is rotatably mounted in the gearbox about the main axis thereof which is oriented substantially perpendicular to the main axis of the drive shaft.

10 Claims, 1 Drawing Sheet

(52) U.S. Cl.
CPC .. *F05D 2250/313* (2013.01); *F05D 2250/314* (2013.01); *F05D 2260/4031* (2013.01); *Y02T 50/671* (2013.01)

(56) References Cited

U.S. PATENT DOCUMENTS

| | | | | |
|---|---|---|---|---|
| 3,638,421 | A * | 2/1972 | Chilman | F02C 7/20 244/54 |
| 4,068,470 | A * | 1/1978 | Sargisson | F02C 7/32 60/226.1 |
| 7,418,821 | B2 * | 9/2008 | Butt | F01D 25/20 60/778 |
| 8,490,410 | B2 * | 7/2013 | Suciu | F02C 7/32 60/788 |
| 10,145,260 | B2 * | 12/2018 | Armange | F16H 1/225 |

OTHER PUBLICATIONS

French Search Report dated Oct. 1, 2015 in FR 1552426 filed Mar. 24, 2015.
U.S. Appl. No. 15/111,618, filed Jul. 14, 2016, Now U.S. Pat. No. 2016/0333792 A1, Julien Viel et al.

* cited by examiner

GEARBOX COMPRISING AN IMPROVED REDUCTION GEAR

TECHNICAL FIELD

The invention relates to a gearbox for an aircraft turbine engine, which comprises two internal drive shafts that rotate in the gearbox at different rotation speeds and which comprises compact transmission means.

PRIOR ART

A turbine-engine gearbox, for example for an aircraft turbine engine, is an energy distribution system making it possible to drive and support a plurality of components and accessories of the turbine engine from the energy produced by the turbine engine.

For this purpose, the gearbox comprises a drive shaft that is connected to the rotor of the turbine engine, and a plurality of output shafts that are connected to this drive shaft.

Each output shaft is associated with one or more accessories of the turbine engine and must therefore supply to the accessory a suitable torque and rotation speed. Thus, for example, the output shafts turn at different rotation speeds.

In general terms, the drive shaft is oriented in the main axis of the gearbox, while the output shafts are oriented perpendicular to the main shaft.

According to one embodiment, the coupling of the output shafts with a drive shaft is achieved by means of ring and pinion gears. This coupling method makes it possible to limit the number of components of the gearbox and consequently reduce efficiency losses. This coupling method also makes it possible to reduce the size and weight of the gearbox.

However, in the case in which the rotation speed of an output shaft is greatly reduced compared with the rotation speed of a drive shaft, the use of a single ring and pinion gear is not possible since it would have to comprise a large-diameter toothed wheel, which would involve an excessive space requirement for this toothed wheel in the gearbox.

This is why a gearbox comprising a secondary drive shaft that is connected to the main drive shaft by a speed reducer has been proposed.

This makes it possible to limit the dimensions of the ring and pinion gear associated with an output shaft that has to rotate at reduced speed.

According to a known embodiment, the gearbox comprises an epicyclic train system forming the speed reducer.

However, an epicyclic train system consists of a large number of components, which increases the weight of the gearbox and also increases the risk of breakdown through failure of one of the components of the epicyclic train system.

The aim of the invention is to propose a gearbox comprising a speed reducer of simplified construction, having a reduced size.

DISCLOSURE OF THE INVENTION

The invention proposes a gearbox for an aircraft turbine engine that comprises a drive shaft, a secondary drive shaft that is coupled to the drive shaft by means of a reduction mechanism, and an output shaft that is coupled to the drive shaft or to the secondary drive shaft by means of a set of ring and pinion gears, characterised in that the reduction mechanism comprises an intermediate shaft, a first end of which is coupled to the drive shaft by means of a first stage of gears and the second end of which is coupled to the secondary drive shaft by means of a second stage of gears, and in that the intermediate shaft is mounted in the gearbox so as to rotate about the main axis thereof oriented substantially perpendicular to the main axis of the drive shaft.

The use of an intermediate shaft for effecting the speed reduction makes it possible to limit the number of components of the speed reducer. In addition, the orientation of the intermediate shaft with respect to the drive shaft makes it possible to limit the space requirement for the speed reducer in the gearbox.

Preferably, each of the first or second stage of gears comprises a pinion mounted on the drive shaft or the secondary drive shaft and a pinion mounted on the associated end of the intermediate shaft.

Preferably, the main axis of the secondary drive shaft is substantially coaxial with the main axis of the drive shaft and the intermediate shaft is situated between two facing ends of the drive shaft of the secondary drive shaft.

Preferably, each facing end of the drive shaft and of the secondary drive shaft carries the pinion of the first or second stage of gears that is associated therewith.

Preferably, the gearbox comprises means for guiding the intermediate shaft in rotation about its main axis, which are arranged at each end of the intermediate shaft.

Preferably, the pinions of the stages of gears, which are carried by the ends of the intermediate shaft, are situated between said means for guiding the intermediate shaft in rotation about its main axis.

Preferably, the intermediate shaft comprises vibration-damping means.

Preferably, the gearbox comprises means for coupling the intermediate shaft with manual control means of the gearbox.

The invention also proposes an aircraft turbine engine that comprises a gearbox as defined above.

Preferably, the turbine engine comprises means of connecting the drive shaft to the rotor of the turbine engine.

BRIEF DESCRIPTION OF THE DRAWINGS

Other features and advantages of the invention will emerge from a reading of the following detailed description, for an understanding of which reference will be made to the accompanying figures, among which.

DETAILED DISCLOSURE OF PARTICULAR EMBODIMENTS

Figure 1:
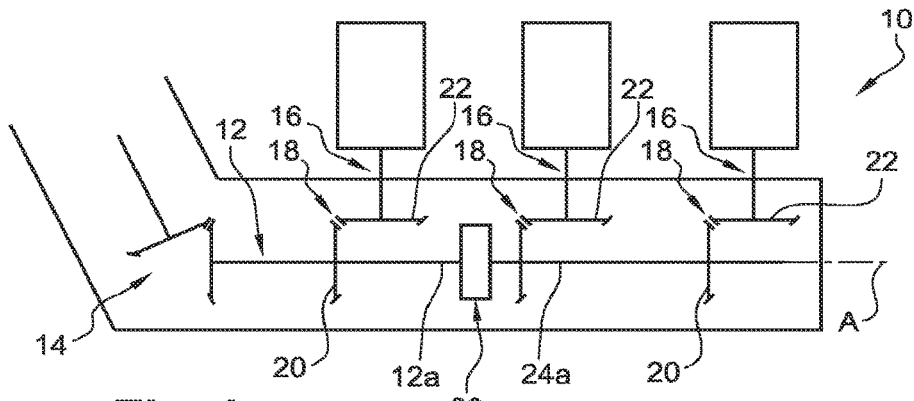
FIG. 1 is a schematic representation of a gearbox comprising a secondary drive shaft that is coupled to the drive shaft by means of a reduction mechanism according to the invention.

FIG. 1 shows a gearbox 10 for a turbine engine, in particular an aircraft turbine engine. This gearbox 10 is designed to take off a certain quantity of energy from the rotor of the turbine engine, in order to redistribute this energy to a plurality of items of equipment of the turbine engine.

The gearbox 10 comprises a drive shaft 12 that is connected to the rotor (not shown) of the turbine engine by a transmission system 14, by means of which the energy is taken off, and comprises a plurality of output shafts 16, each of which is connected to one or more items of equipment of the turbine engine.

The main axis A of the drive shaft 12 is here parallel to the main axis of the gearbox 10. The main axis of each output shaft 16 is perpendicular to the main axis of the drive shaft 12.

Each output shaft 16 is connected to the drive shaft 12 by a ring and pinion gear 18 that is associated therewith. A ring and pinion gear 18 consists of a pinion 20 that is mounted on the drive shaft 12 and a toothed wheel 22 that is mounted on the associated output shaft 16.

Each of the pinion 20 and toothed wheel 22 of a ring and pinion gear 18 are in engagement with each other and comprise complementary conical teeth.

The ratio between the diameter of the toothed wheel 22 and the pinion 20 of the ring and pinion gear 18 defines the reduction ratio of this ring and pinion gear 18. The higher this ratio, that is to say the larger the toothed wheel 22 or the smaller the pinion 20, the higher the reduction ratio of the ring and pinion gear 18.

However, in order to be able to obtain a high reduction ratio, merely the dimensional ratio between the pinion 20 and the toothed wheel 22 is not sufficient since it would involve an excessively large diameter of the toothed wheel 22.

This is why the gearbox 10 comprises a secondary drive shaft 24 that is interposed between the drive shaft 12 and some output shafts 16. The secondary drive shaft thus carries the pinion 20 of some ring and pinion gears 18.

The secondary drive shaft 24 is here coaxial with the drive shaft 12 and is situated in line therewith. One end 24a of the secondary drive shaft 24 is situated axially facing and in the vicinity of an end 12a of the drive shaft 12.

The secondary drive shaft 24 is connected to the drive shaft 12 by a reduction mechanism 26 that enables the rotation speed of the secondary drive shaft 24 to differ from the rotation speed of the drive shaft 12.

The combination of the reduction ratio provided by the reduction mechanism 26 with the reduction ratio of a ring and pinion gear 18 makes it possible to obtain a sufficiently high total reduction ratio without the gearbox 10 comprising a component having excessively large dimensions.

Figure 2:
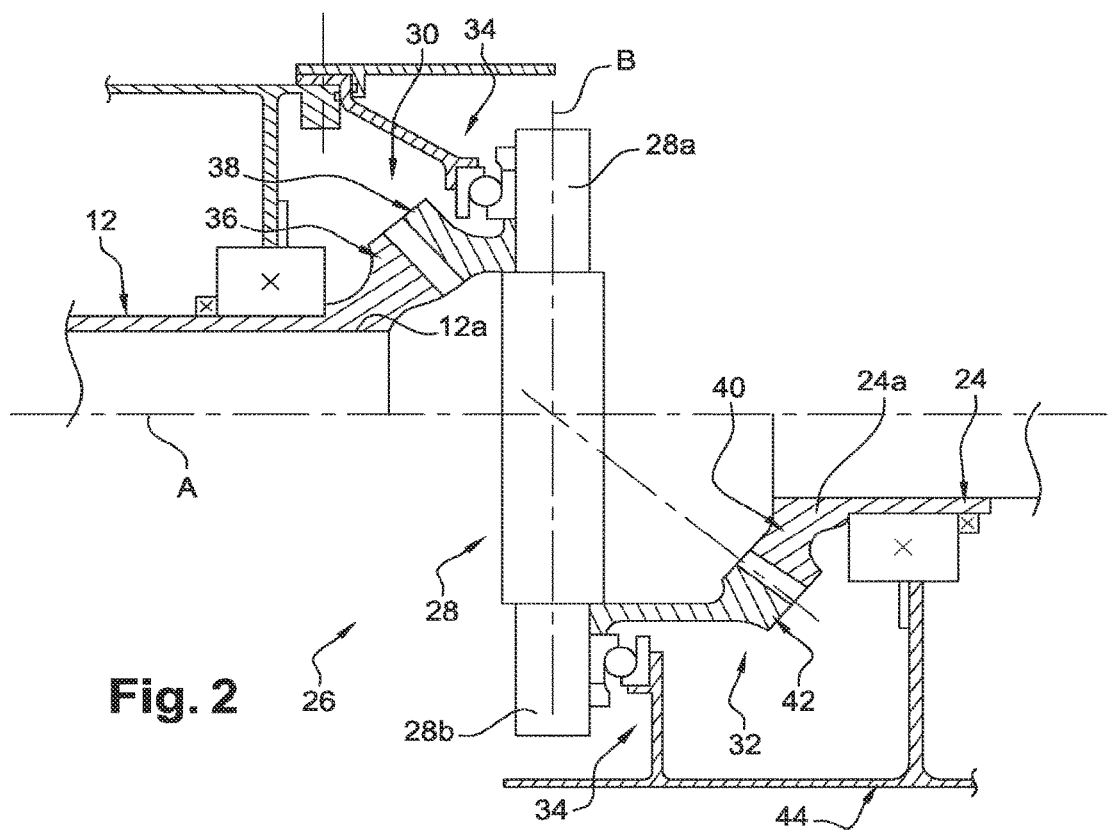
FIG. 2 is a detail to a larger scale of the reduction mechanism according to the invention.

As can be seen in more detail in FIG. 2, the reduction mechanism 26 comprises an intermediate shaft 28 that is simultaneously coupled to the facing ends 12a, 24a of the drive shaft 12 and of the secondary drive shaft 24 by means of two stages of gears 30, 32.

The main axis B of the intermediate shaft 28 is perpendicular to the main axis A of the drive shaft 12 and of the secondary drive shaft 24.

In the following description, it will be considered that the axial direction is the direction along the main axis A of the drive shaft 12 and that any radial direction is a direction perpendicular to this main axis A of the drive shaft 12.

The intermediate shaft 28 is situated axially between the facing ends 12a, 24a of the drive shaft 12 and of the secondary drive shaft 24. It is mounted so as to be free to rotate with respect to an external casing of the gearbox 10 about its main axis B.

The gearbox 10 comprises two bearings 34 for the rotational guidance of the intermediate shaft 28, each of which receives an associated end 28a, 28b of the intermediate shaft.

A first end 28a of the intermediate shaft 28 is coupled to said end 12a of the drive shaft 12 by means of a first stage of gears 30 and the second end 28b of the intermediate shaft 28 is coupled to said end 24a of the secondary drive shaft 24 by means of the second stage of gears 32.

The first stage of gears 30 comprises a pinion 36 carried by said end 12a of the drive shaft 12 and a pinion 38 carried by the first end 28a of the intermediate shaft 28. The second stage of the second stage of gears 32 comprises a pinion 40 carried by said end 24a of the secondary drive shaft 24 and a pinion 42 carried by the second end 28b of the intermediate shaft 28.

Preferably, each stage of gears 30, 32 consists of a ring and pinion gear, or a spiral bevel gear.

Preferably, in order to limit the size of the reduction mechanism 26, the pinions 38, 42 carried by the ends 28a, 28b of the intermediate shaft 28 are situated radially between the two bearings 34 guiding the intermediate shaft.

The presence of two stages of gears 30, 32 in the reduction mechanism makes it possible to provide a sufficiently high reduction ratio, without the reduction mechanism 26 being too bulky.

In addition, the radial position of the pinions 38, 42 that are carried by the intermediate shaft 28, with respect to the main axis A of the drive shaft 12, is defined by the size of the associated pinions 38, 40, and may thus be relatively small.

Thus, by virtue of the orientation of the intermediate shaft 28 perpendicular to the main axis A of the drive shaft 12, the incorporation of this intermediate shaft 28 in the gearbox 10 does not involve an increase in the dimensions of the gearbox 10 along the main axis A of the drive shaft 12.

According to the embodiment shown in FIG. 2, the intermediate shaft 28 consists of a metal element of revolution. This embodiment is relatively simple and inexpensive and ensures good rigidity of the reduction mechanism 26.

According to a variant embodiment that is not shown, the intermediate shaft 28 is produced from one or more materials and comprises vibration-damping means.

According to another aspect of the reduction mechanism 26, and given that the main axis P of the intermediate shaft 28 is perpendicular to the main axis A of the drive shaft 12, at least one end 28a, 28b of the intermediate shaft 28 is situated in the vicinity of the external wall 44 of the gearbox 10.

In addition, this end 28a, 28b of the intermediate shaft 28 is oriented substantially perpendicular to the external wall 44 of the gearbox 10.

According to one embodiment, not shown, of the gearbox 10, a member for manual control of the gearbox 10 is able to be connected to one end 28a, 28b of the intermediate shaft 28. For example, the manual-control member consists of a crank comprising a control shaft that is able to pass through an associated opening formed in the wall 44 of the gearbox 10.

According to the embodiment shown in the figures, the drive shaft 12 and the secondary drive shaft 24 are coaxial with the main shaft A.

According to a variant embodiment, the secondary drive shaft 24 is offset radially with respect to the main shaft A of the drive shaft 12. Such a variant is made possible by the fact that it is possible to adapt the position of the pinion body 42 of the second stage of gears along the intermediate shaft 28, and through the choice of the respective dimensions and positions of the pinions 40, 42 of the second gear 32.

According to the embodiment shown in the figures, the main axis C of the secondary drive shaft 24 is coaxial with the main axis A of the drive shaft 12. It will be understood that the invention is not limited to this embodiment and that the main axis C of the secondary drive shaft 24 may be inclined with respect to the main axis A of the drive shaft 12.

Such an angular offset of the main axes of the drive shafts is permitted by the presence of spiral bevel pinions in the reduction mechanism 26. This is because such pinions allow any relative inclination of the shafts, which are therefore not necessarily perpendicular or orthogonal with respect to each other.

The same consequently applies with regard to the intermediate shaft 28, which may therefore be inclined with respect to the drive shaft 12 at an angle different from 90°.

The invention claimed is:

1. A gearbox for an aircraft turbine engine, the gearbox comprising:
   a drive shaft,
   a secondary drive shaft coupled to the drive shaft with a reduction mechanism, and
   output shafts, one of which being coupled to the drive shaft, an other of which being coupled to the secondary shaft with a set of ring and pinion gears,
   wherein the reduction mechanism comprises an intermediate shaft, a first end coupled to the drive shaft with a first stage of gears and the second end coupled to the secondary drive shaft with a second stage of gears.

2. The gearbox according to claim 1, wherein each of the first or second stage of gears comprises a pinion mounted on the drive shaft or the secondary drive shaft and a pinion mounted on the associated end of the intermediate shaft.

3. The gearbox according to claim 2, wherein the main axis of the secondary drive shaft is substantially coaxial with the main axis of the drive shaft, and the intermediate shaft is situated between two facing ends of the drive shaft and of the secondary drive shaft.

4. The gearbox according to claim 1, wherein the intermediate shaft is situated between two facing ends of the drive shaft and of the secondary drive shaft.

5. The gearbox according to claim 3, wherein each facing end of the drive shaft and of the secondary drive shaft carries the pinion of the first or second stage of gears that is associated therewith.

6. The gearbox according to claim 2, comprises means for guiding the intermediate shaft rotatably about its main axis, which are arranged at each end of the intermediate shaft.

7. The gearbox according to claim 6, wherein the pinions of the stages of gears, which are carried by the ends of the intermediate shaft, are situated between said means for guiding the intermediate shaft in rotation about its main axis.

8. The gearbox according to claim 1, wherein the main axis of the intermediate shaft is perpendicular to the main axis of the drive shaft.

9. An aircraft turbine engine, comprising a gearbox according to claim 1.

10. A turbine engine according to claim 9, further comprising means for connecting the drive shaft to the rotor of the turbine engine.

* * * * *